(12) United States Patent
Raiford et al.

(10) Patent No.: US 11,916,510 B1
(45) Date of Patent: Feb. 27, 2024

(54) STRUCTURAL SUPPORT GRID FOR FLOATING SOLAR ARRAY

(71) Applicant: NORIA ENERGY, Sausalito, CA (US)

(72) Inventors: James Raiford, San Francisco, CA (US); Jason King, San Francisco, CA (US); Alex Mayer, Mill Valley, CA (US); Becca Suchower, Sausalito, CA (US); Brian Atchley, Petaluma, CA (US)

(73) Assignee: NORIA ENERGY, Sausalito, CA (US)

( * ) Notice: Subject to any disclaimer, the term of this patent is extended or adjusted under 35 U.S.C. 154(b) by 0 days.

(21) Appl. No.: 18/495,582

(22) Filed: Oct. 26, 2023

(51) Int. Cl.
*H02S 30/10* (2014.01)
*B63B 35/38* (2006.01)
*B63B 35/44* (2006.01)
*B63B 1/12* (2006.01)

(52) U.S. Cl.
CPC .............. *H02S 30/10* (2014.12); *B63B 1/125* (2013.01); *B63B 35/38* (2013.01); *B63B 35/44* (2013.01); *B63B 2035/4453* (2013.01)

(58) Field of Classification Search
None
See application file for complete search history.

(56) References Cited

U.S. PATENT DOCUMENTS

2021/0179239 A1\* 6/2021 Lee .................... B63B 35/44
2022/0024542 A1\* 1/2022 Sakaguchi ........... B63B 35/38

FOREIGN PATENT DOCUMENTS

WO    WO-2022216860 A1 \* 10/2022 ............. B63B 35/38

\* cited by examiner

*Primary Examiner* — Jayne L Mershon
(74) *Attorney, Agent, or Firm* — David R. Heckadon; Gordon Rees Scully Mansukhani LLP

(57) ABSTRACT

A floating solar array having a grid of structural members with openings therebetween and supporting pontoons underneath. One or more floating solar PV modules are positioned in each of the openings and elastic connectors are used to isolate these floating solar PV modules from the movement of the structural member grid. A first end of each of the elastic connectors are connected to the structural members or to one of the grid supporting pontoons, while a second end of each elastic connector is connected either to a PV module supporting pontoon or to the PV module mounted thereon. Together, these elastic connectors allow for limited linear and torsional movement of each of the floating solar PV modules with respect to the structural member grid.

16 Claims, 13 Drawing Sheets

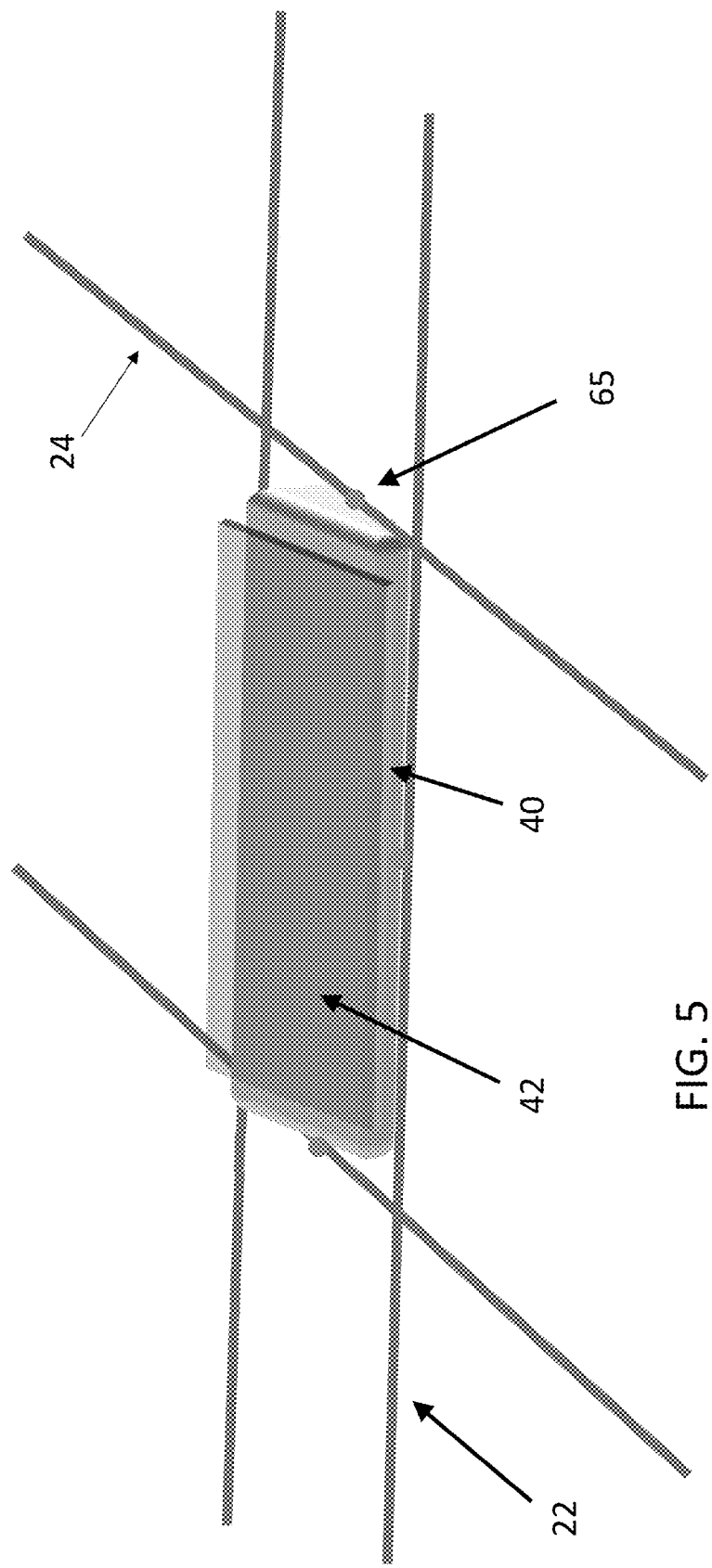

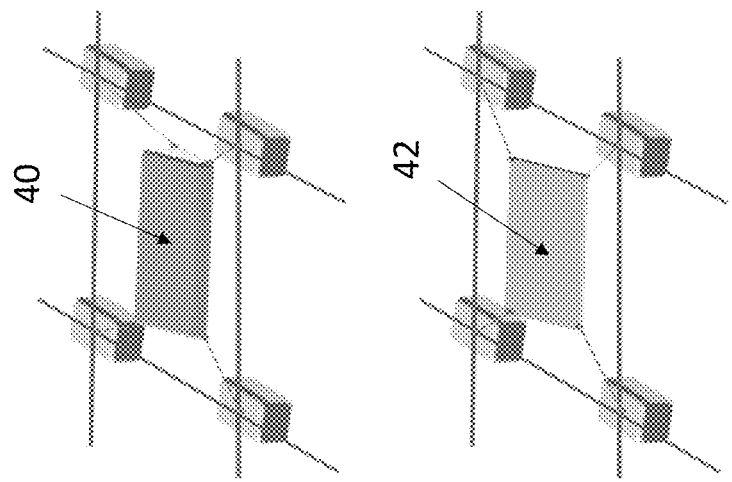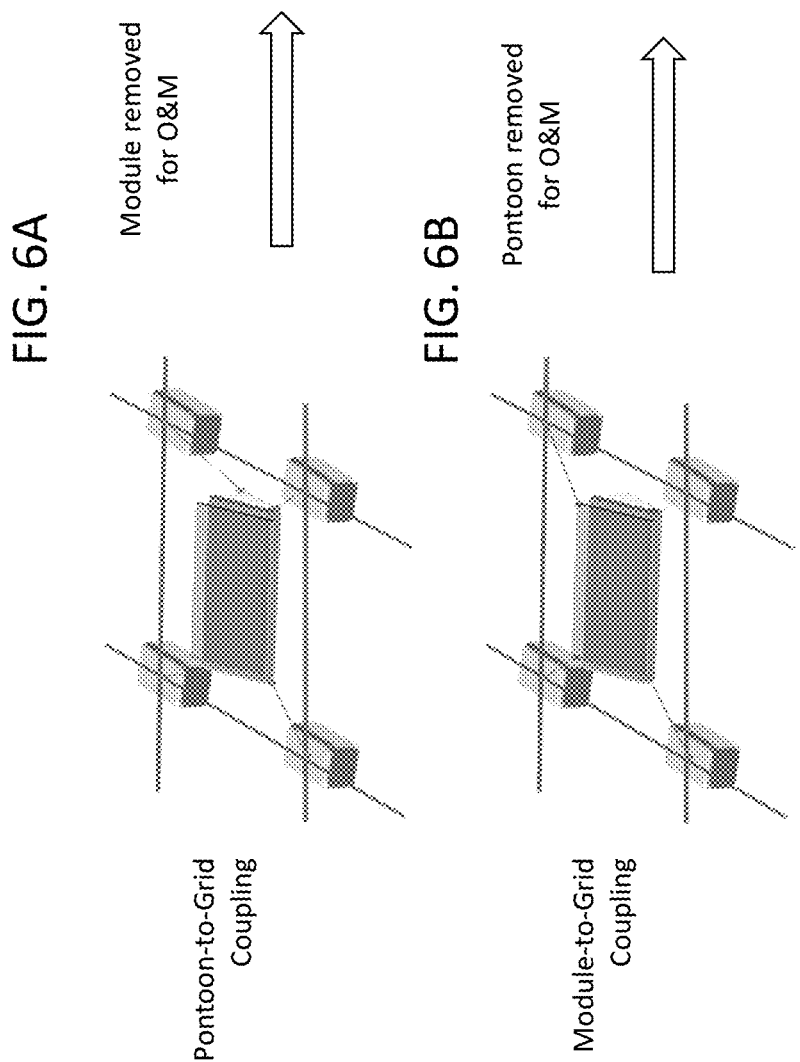
FIG. 6A
FIG. 6B

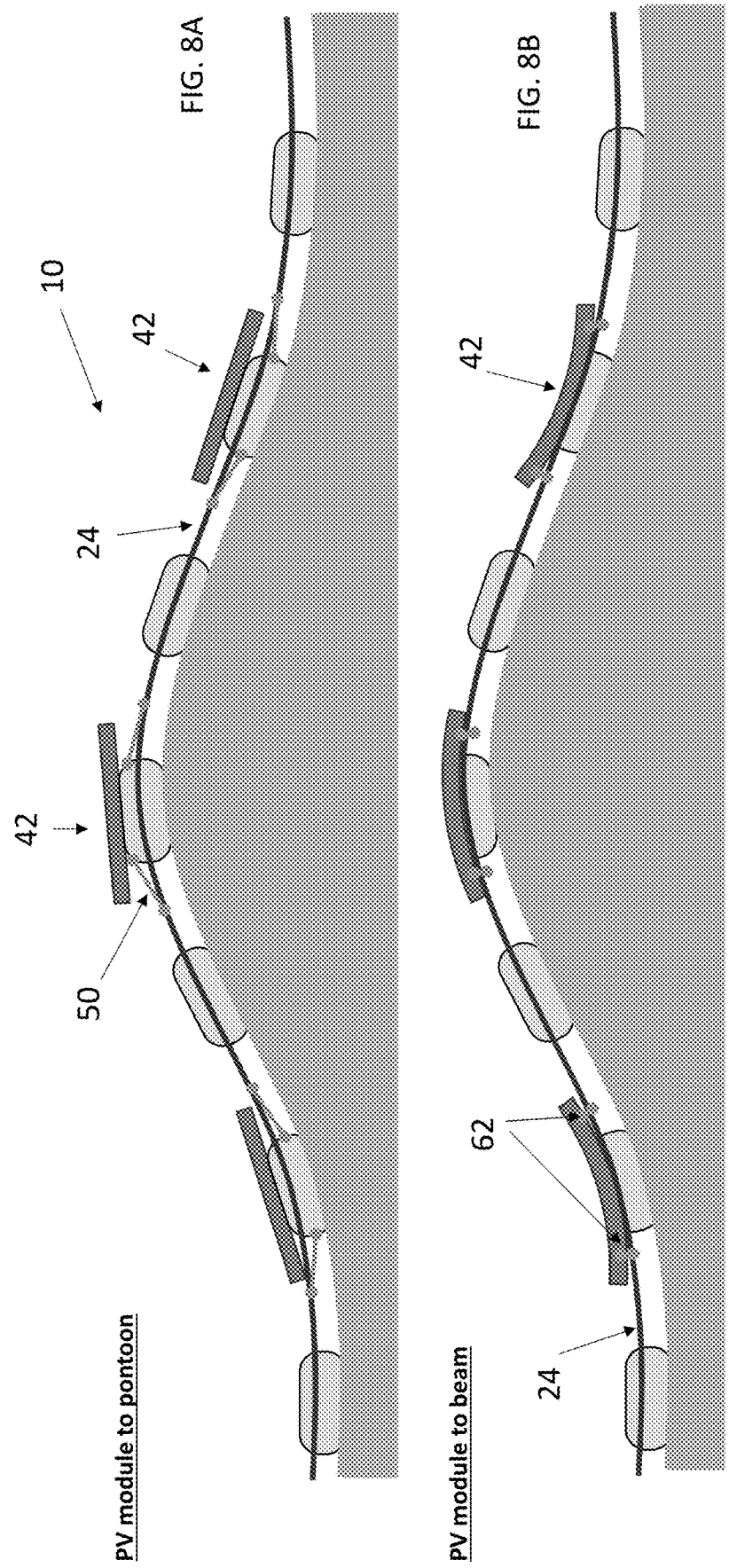

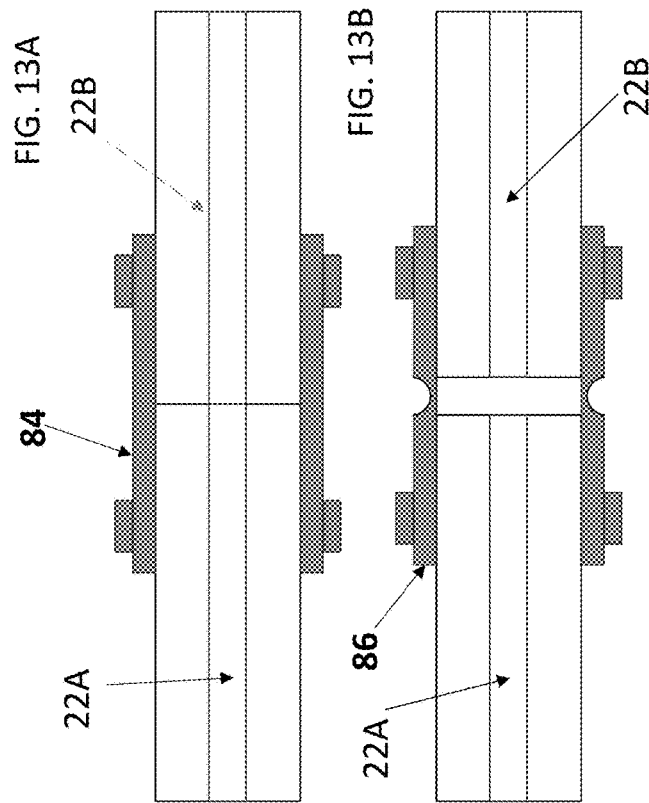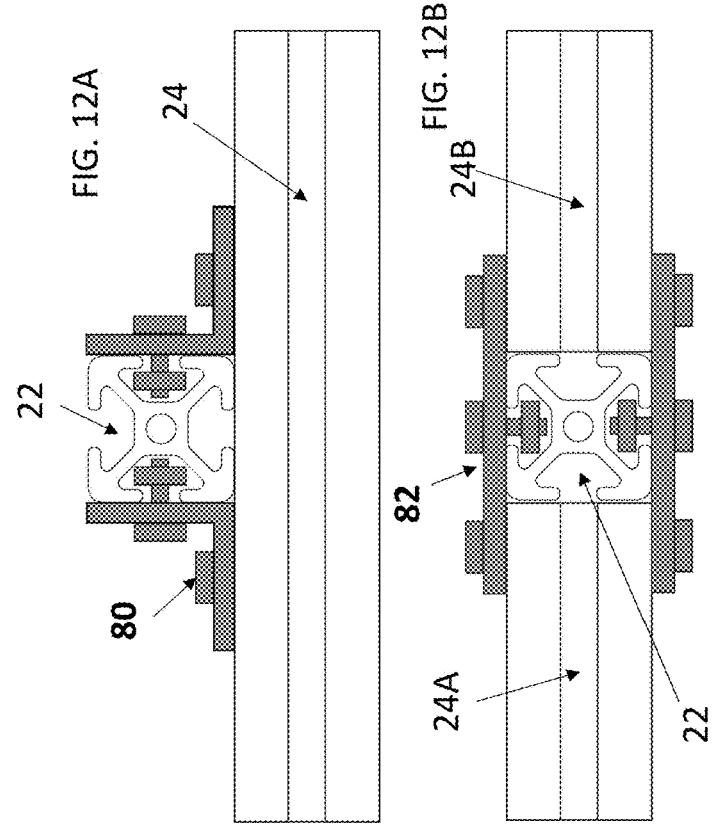

STRUCTURAL SUPPORT GRID FOR FLOATING SOLAR ARRAY

TECHNICAL FIELD:

The present invention relates to floating solar photovoltaic (PV) arrays in general, and to systems for isolating the individual floating solar PV modules in the array from wave forces exerted on the structural members of the array. The present invention also relates to systems for facilitating and improving the process for repair and replacement of individual PV modules and pontoons in floating solar arrays.

BACKGROUND OF THE INVENTION:

In contrast to land-based solar PV arrays, floating solar PV arrays have many advantages. The biggest advantage is that floating solar PV arrays do not require large areas of land be set aside for their deployment. A second advantage of floating solar PV arrays is that their shading effect on a water body can help reduce evaporation and improve water quality by preventing harmful algal blooms.

Floating solar PV arrays encounter wave action in the field that exerts constant stresses on the array. Forces from wave action are constantly changing both in intensity and in direction. This results in constant torsional and rotational bending of the array as it floats upon the water. A common problem is when these forces are imparted onto the PV module and the pontoon that is supporting the PV module. This problem can be seen, for example, in Published Patent Application 2018/0119994, entitled Floating Solar System. In this system, the PV modules are rigidly connected directly to the grid of structural members. Therefore, the bending and torsional stresses on the array are transmitted directly to the PV modules which simply move together with the grid. Similarly, in Published Patent Application 2021/0058022, also entitled Floating Solar System, the same pontoons that support the grid structure also support the PV modules. The pontoons are rigidly connected to the grid structure and the PV modules are rigidly connected to the pontoons. In this configuration, stresses on the array can be transferred to the PV modules themselves.

What is instead desired is a floating solar PV array that has overall strength and rigidity, yet is able to mitigate the effects of bending and torsional stresses caused by wave action on the array. As such, it would be especially desirable to isolate the individual PV modules from such bending and torsional stresses. As will be shown, the present invention addresses this concern.

Another disadvantage of floating solar PV arrays (as compared to land-based PV arrays), is that floating arrays typically use large, rigid, hollow floats to provide buoyancy and support the PV modules. The problem with using large, rigid, hollow floats is that they take up considerable space both to store and to ship. Ideally, the smaller the weight and volume of physical hardware making up the floating solar array system, the better.

Therefore, what is instead desired is a floating solar PV array system which does not require manufacturing, storing, and shipping such large, rigid, hollow floats. As will be shown, the present system addresses this concern and does not use large, rigid, hollow floats. In addition, the present system uses a small amount of physical hardware to construct the array itself, and is thus economical to store and to ship to a jobsite.

Another problem with floating solar PV arrays is that their floats are typically made of large amounts of plastic. Plastic has some environmental concerns, and it is desirable to minimize plastic usage. As will be shown, the present system has environmental benefits by avoiding such large, rigid, hollow plastic floats.

SUMMARY OF THE INVENTION:

The present invention provides a structural support grid system for a floating solar array. In preferred aspects, this system comprises: (a) a connected grid of structural members with open spaces between adjacent structural members; (b) a plurality of grid supporting pontoons with the grid supporting pontoons supporting the grid of structural members; (c) a plurality of PV module supporting pontoons; (d) a plurality of PV modules, wherein each PV module is supported by at least one of the PV module supporting pontoons, and wherein the PV modules are positioned in the open spaces between the adjacent structural members; and (e) a plurality of elastic connectors that isolate each of the PV modules from forces exerted on the grid of structural members.

As such, the present novel elastic connectors isolate the PV modules from movement of the grid of structural members while still permitting restrained movement (e.g.: limited linear and torsional movement) of each of the plurality of floating solar PV modules with respect to the grid of structural members. In preferred aspects, one end of each elastic connector is connected to either the grid of structural members or alternately to one of the grid supporting pontoons, and the other end is connected to either one of the PV module supporting pontoons or alternately to one of the PV modules.

In preferred aspects, the structural members are generally straight beams formed from an extruded polymer such as glass-reinforced polyamide (i.e.: nylon), and have associated hardware that hold them together at right angles to form rectangular openings between adjacent structural members. An advantage of this design is that a minimal amount of hardware is actually required to provide a very strong grid for the array. An advantage of the present system is that the grid structure formed by the straight members provides the overall structural rigidity to the entire array while the elastic connectors prevent the transmission of stresses caused by wave action on the array to the PV modules themselves.

As can be appreciated, the present system significantly reduces the amount of large bulky components that need to be stored and shipped to the jobsite to assemble a floating PV array. First, the structural members of the present array may be made from long sections of reinforced polymer members (which are also easy to ship and store when not assembled). Second, in preferred aspects, both the grid supporting pontoons and the PV module supporting pontoons are flat-packable and plastic membrane-based that are optionally made from thermoplastic polyolefin (TPO) with a polymer (e.g.: polyester) reinforcing scrim. Other suitable membrane materials can include, but are not limited to, high-density polyethylene (HDPE), low-density polyethylene (LDPE), polyethylene terephthalate (PET) and ethylene propylene diene monomer (EPDM). This use of membrane pontoons that are only inflated at the jobsite makes them inexpensive and easy to ship and store. Optionally, such inflatable pontoons may even include interior or exterior reinforcing structures which help the pontoons maintain a preferred shape after they have been fully inflated.

In preferred deployments, one floating solar PV module is disposed in each of the openings of the grid. Four elastic connectors may then be used for each PV module, with one attached to each of the four corners of the support pontoon onto which the PV module is mounted. Alternately, the four elastic connectors can instead be attached to the four corners of the PV module itself. In some preferred embodiments, the elastic connectors can even be interchangeably moved between the corners of the PV module support pontoon (underneath the PV module) and the corners of the PV module itself.

The advantage of the present system (when the elastic connectors are attached to the PV module support pontoon) is that the PV module can easily be removed and repaired or replaced. Similarly, the advantage of the present system (when the elastic connectors are instead attached to the PV module itself) is that the PV module supporting pontoon can instead be easily removed and repaired or replaced. In those instances where the elastic connector can be interchangeably moved between the PV module support pontoon and the PV module as desired, either the PV module or the PV module support pontoon can be removed and serviced, as desired.

In another preferred orientation, a plurality (e.g.: four) floating solar PV modules are disposed in each of the openings of the grid. In such a placement, the four floating solar PV modules are first connected together as a unit with a first set of elastic connectors and then the four corners of this unit are connected to the grid of structural members with a second set of elastic connectors.

In further preferred aspects, the inflatable PV module support pontoon has a top surface that is angled relative to the horizontal plane, and the PV module is mounted on top of the pontoon with brackets, rails or other suitable fasteners. In this configuration, the PV module tilt is built into the support float.

In short, the present system provides a floating solar PV array system that is low-cost and easy to manufacture, ship, install, and maintain. Additionally, the present system advantageously decouples installed solar PV modules from environmental forces that are transferred through the supporting grid.

BRIEF DESCRIPTION OF THE DRAWINGS:

FIG. 5 is a view similar to FIGS. 2A to 4, but with the PV module support pontoon being directly and rigidly connected to the structural members of the array (i.e.: with no elastic connectors being used).

FIG. 6A illustrates the removal of the PV module according to the arrangement of FIG. 2A.

FIG. 6B illustrates the removal of the PV module support pontoon according to the arrangement of FIG. 3.

FIGS. 8A and 8B are respective side elevation views of the array showing the advantage of the present elastic connectors as waves pass under the array. FIG. 8A corresponds to the arrangement of FIG. 2A, and FIG. 8B corresponds to an arrangement where the PV modules are coupled directly to the structural grid.

FIG. 12A is an elevation view of an L-bracket connecting together a pair of structural members at a right angle.

FIG. 12B is an elevation view of a Cross-plate linking three structural members together at right angles.

FIG. 13A is an elevation view of a Splice connecting the ends of two structural members together.

FIG. 13B is an elevation view of a Hinged Splice connecting the ends of two structural members together.

Figure 1:
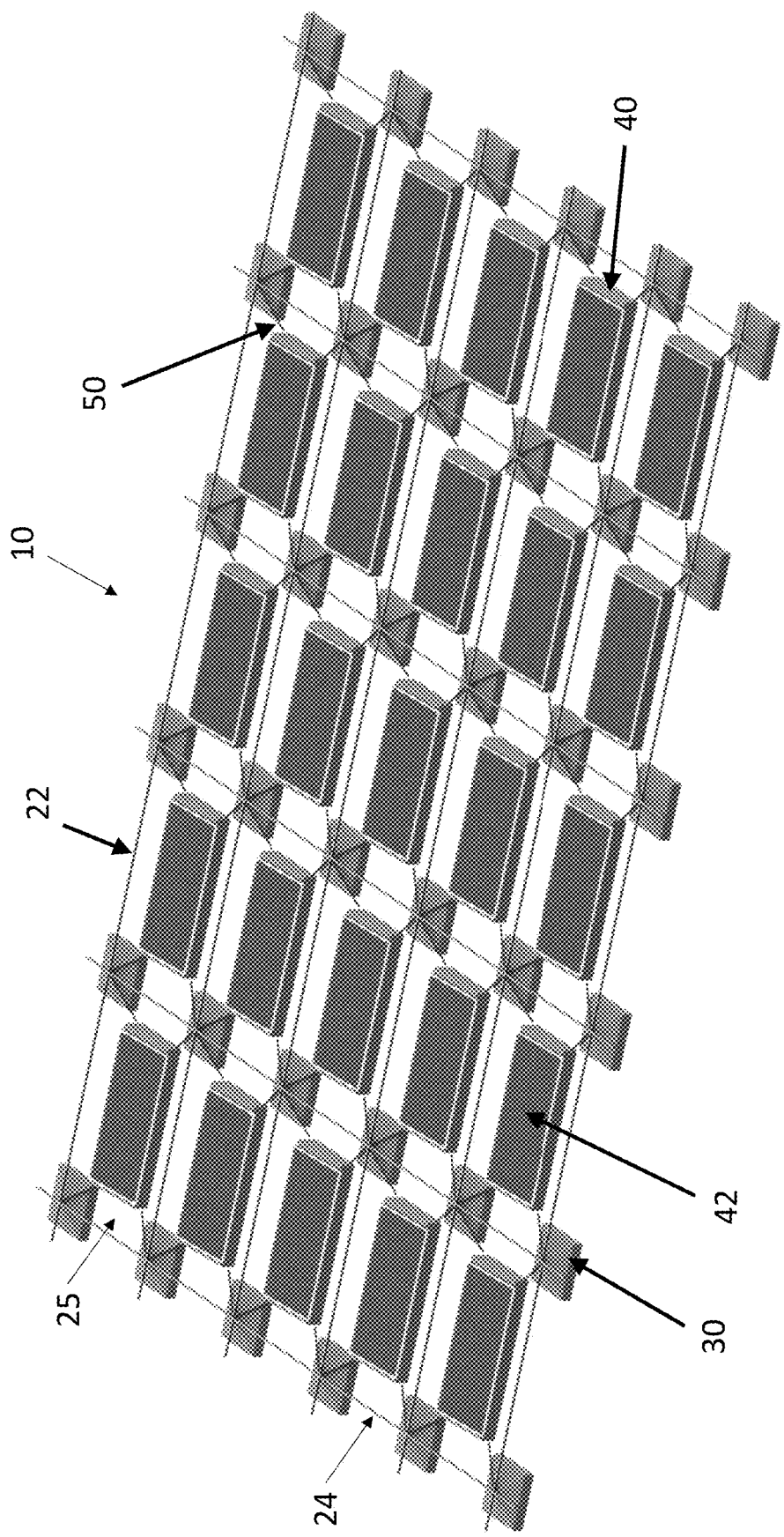
FIG. 1 is a perspective view of the present floating PV solar array.

DETAILED DESCRIPTION OF THE DRAWINGS:

Referring first to FIG. 1, a floating PV solar array 10 is provided. Array 10 provides a structural support grid that comprises a grid of structural members 22 and 24. As can be seen, structural members 22 are positioned parallel to one another and structural members 24 are also positioned parallel to one another. As illustrated, structural members 22 are positioned at right angles to structural members 24. Together, adjacent structural members 22 and 24 define rectangular openings 25 therebetween. It is to be understood that the illustrated layout of parallel members 22 and parallel members 24 being perpendicular to one another is merely exemplary, and that the presently claimed system encompasses grid embodiments and structural members of different shapes, sizes and orientations with respect to one another, provided that openings 25 are found between the structural members. Thus, openings 25 need not be rectangular in shape as illustrated, but may be other shapes, all keeping within the scope of the present invention.

Array 10 further comprises a plurality of grid supporting pontoons 30. Grid supporting pontoons 30 support the grid of structural members 22 and 24 positioned thereon. Simply put, the grid of the array (i.e.: members 22 and 24) floats on the tops of the array of grid supporting pontoons 30.

Array 10 further comprises a plurality of PV module supporting pontoons 40. As illustrated, a PV module 42 is positioned on top of each of the PV module supporting pontoons 40. (As referred to herein, a "floating solar PV module" refers to the combination of the module supporting pontoon 40 with a solar PV module 42 mounted thereon).

As can be seen, at least one PV module 42 and PV module supporting pontoon 40 is positioned in the openings 25 formed between the adjacent structural members 22 and 24. A plurality of elastic connectors 50 are also provided. Elastic connectors 50 may optionally be made from any type of rubber. Elastic connectors 50 stretch and contract to isolate each of the PV modules 42 from forces exerted on the grid of structural members 22 and 24. As such, elastic connectors 50 isolate the PV modules 42 from movement of the grid of structural members 22 and 24. As such, elastic connectors 50 permit restrained movement of each of the plurality of floating solar PV modules 40/42 with respect to the grid of structural members 22/24. As a result, elastic connectors 50 permit limited linear and torsional movement of the floating solar PV modules 40/42 with respect to the grid of structural members 22/24.

Elastic connectors 50 may be connected in different arrangements. For example, one end of each elastic connector 50 may be connected directly to structural members 22/24 or to the grid supporting pontoon 30. At their other ends, elastic connectors 50 may be connected to one of the PV module supporting pontoons 40 or to one of the PV modules 42.

Figure 2A:
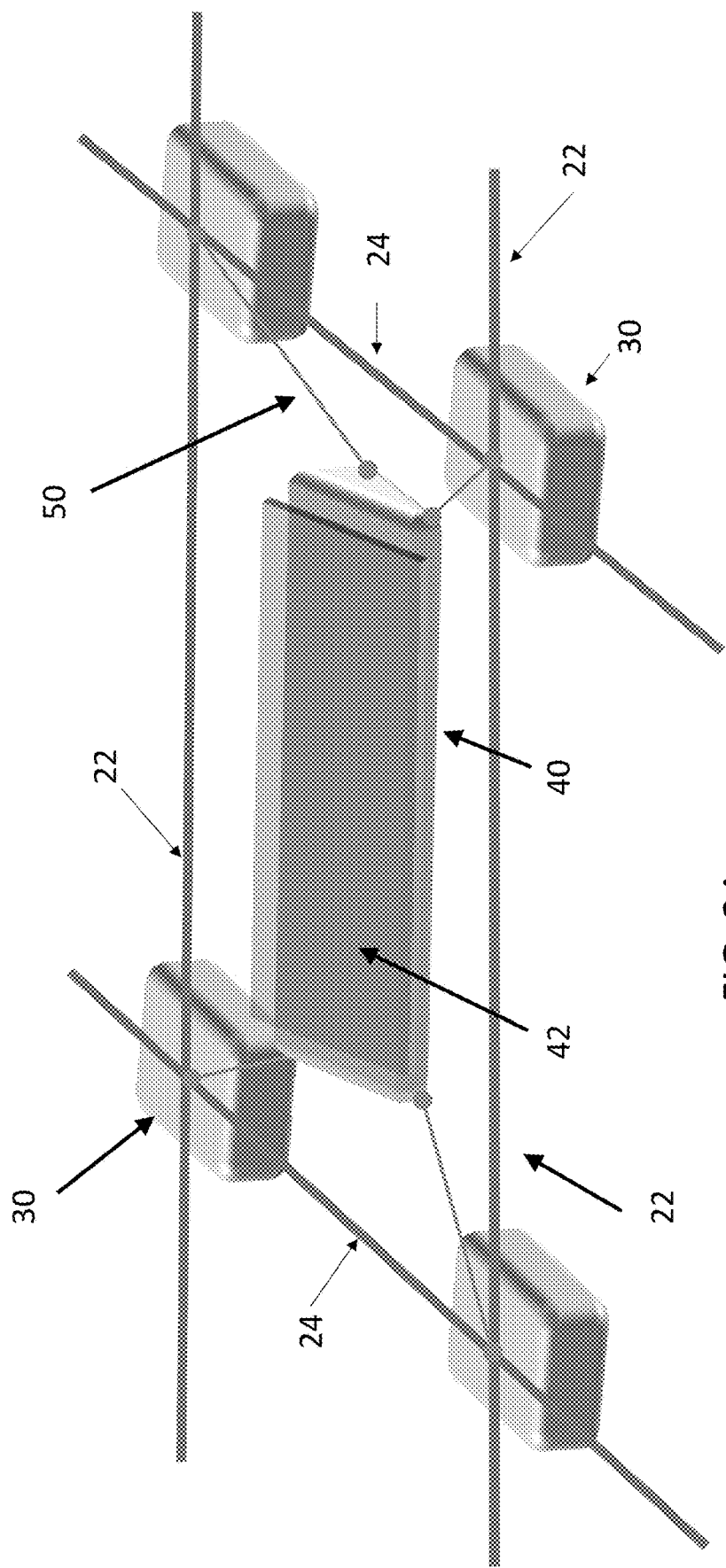
FIG. 2A is a close-up perspective view of one of the floating solar PV modules of FIG. 1 positioned in an opening between adjacent structural members of the array (with an elastic connector at each of the four corners of the PV module support pontoon under the PV module).

FIG. 2A is a close-up perspective view of one of the floating solar PV modules 40/42 of FIG. 1 positioned in an opening between pairs of adjacent structural members 22 and 24 of the array. As can be seen, one of four elastic connectors 50 is connected directly to each of the four corners of the PV module support pontoon 40 (which is underneath of the PV module 42). In this arrangement, the individual PV module 42 can be detached and removed from top of PV module support pontoon 40 and repaired or replaced. This method of removing the PV module 42 while leaving PV module supporting pontoon 40 in position is also illustrated in FIG. 6A.

Figure 2B:
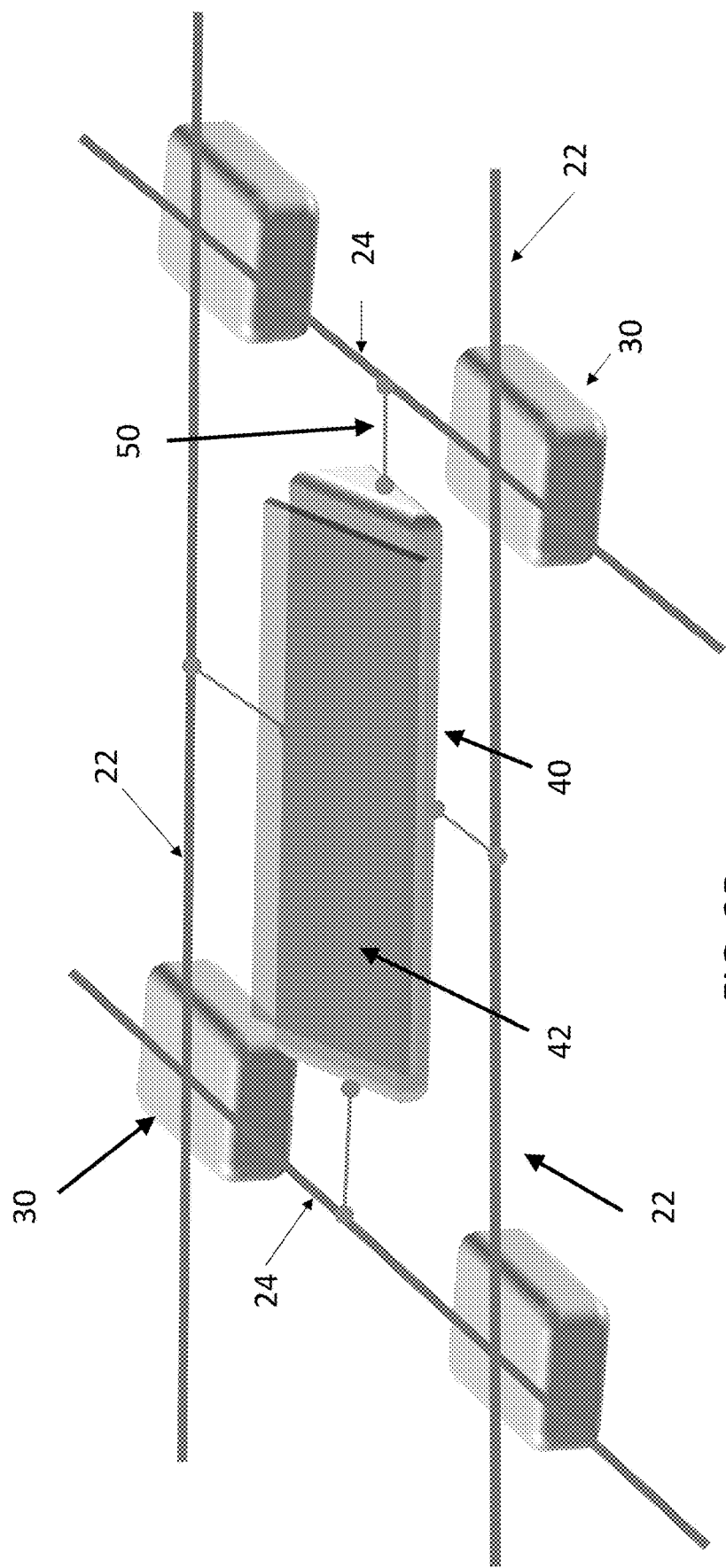
FIG. 2B is a close-up perspective view of one of the floating solar PV modules of FIG. 1 positioned in an opening between adjacent structural members of the array (with an elastic connector at each of the four sides of the PV module support pontoon under the PV module).

FIG. 2B is a perspective view of one of the floating solar PV modules of FIG. 1 positioned in an opening between adjacent structural members of the array (with an elastic connector 50 between each of four structural members 22 and 24 and each of the sides of the PV module support pontoon 40 under the PV module 42).

Figure 3:
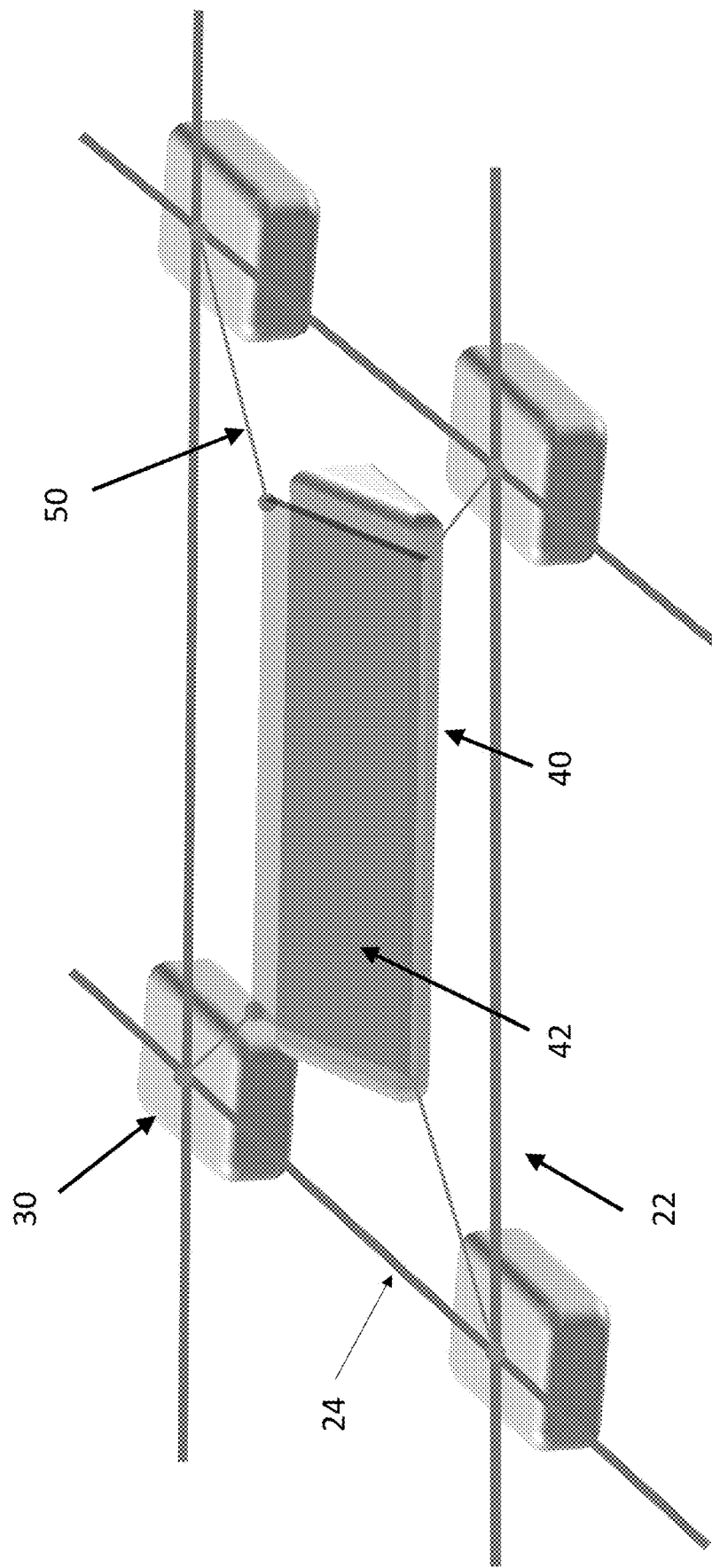
FIG. 3 is a view similar to FIG. 2A, but with the elastic connectors instead being connected to the four corners of the PV module itself.

FIG. 3 is a view similar to FIG. 2A, but with the elastic connectors instead being connected directly to the four corners of the PV module itself. In this arrangement, an individual PV module support pontoon 40 can be detached and removed from underneath the PV module 42 and repaired or replaced. This method of removing the PV module support pontoon 40 while leaving PV module 42 suspended in mid-air above the water during the repair or replacement of the pontoon 40 is also illustrated in FIG. 6B.

It is to be understood that in both FIGS. 2A, 2B and 3 above, the elastic connectors 50 can instead be connected either to the grid supporting pontoon 30 or to one or both of the structural members 22 or 24. As illustrated, the ends of elastic connectors 50 can also be connected to the junctions of members 22 and 24, at or near the location where grid supporting pontoon 30 meets the junctions of members 22 and 24. The present invention encompasses all of these different possibilities.

Figure 4:
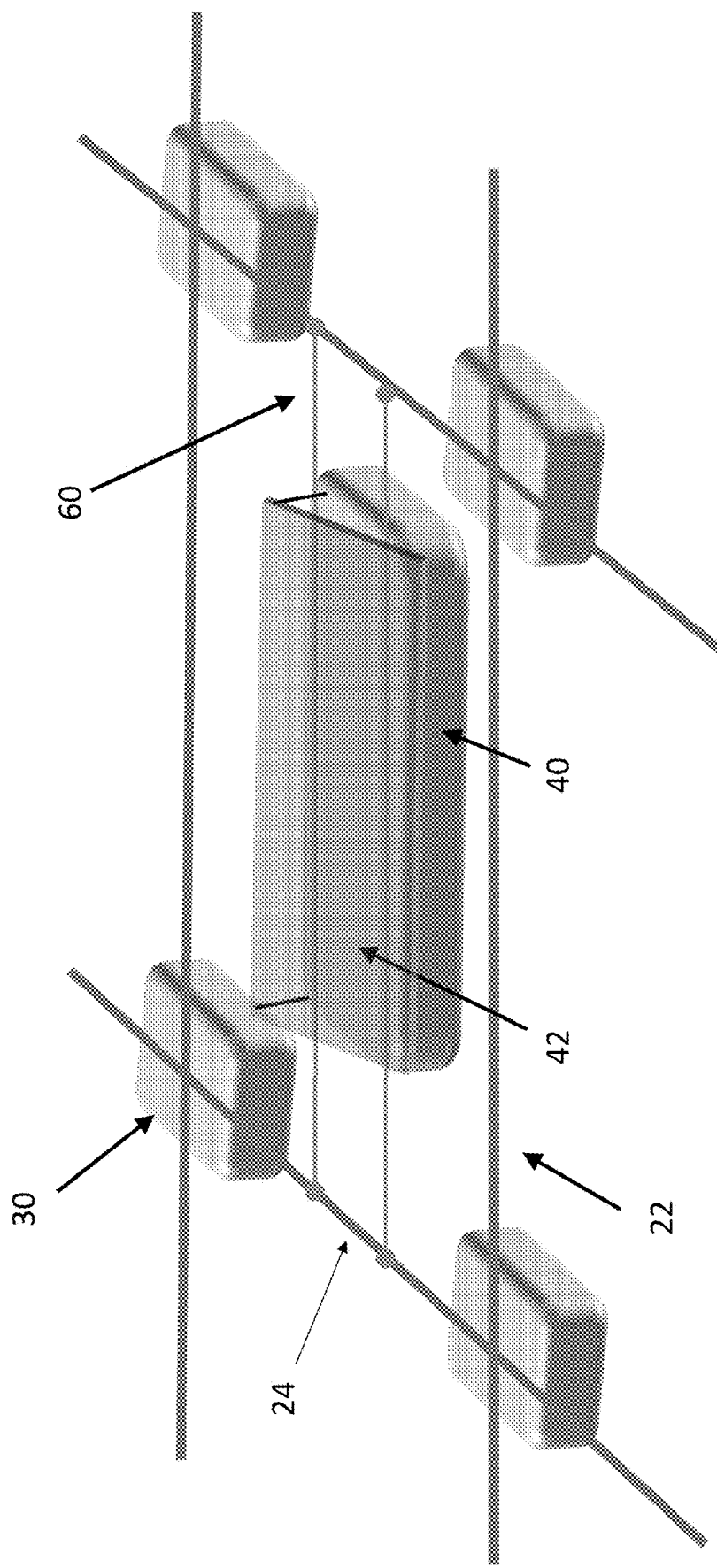
FIG. 4 is a view similar to FIGS. 2A, 2B and 3, but with a pair of support rods (which may or may not be elastic and/or flexible, and which may be rails or cables) connecting the PV module support pontoon to the structural members of the array.

FIG. 4 is a view similar to FIGS. 2A and 3, but with a pair of support rods 60 connecting the PV module support pontoon 40 to the structural members 24 of the array. Support rods 60 may or may not be elastic and/or flexible, and may be rails or cables. This configuration allows for the method of removing the PV module 42 while leaving PV module supporting pontoon 40 in position.

Lastly, for comparison, FIG. 5 is a view similar to FIGS. 2A to 4, but with the PV module support pontoon 42 instead being directly connected to the structural members 22 and 24 of the array with fasteners 65 (i.e.: with no elastic connectors 50 being used). The embodiment of FIG. 5 does not isolate the floating solar PV module 40/42 from the movement of the array 10. As can also be seen, all of the buoyancy for the array comes from pontoons 40, with pontoons 30 not being required.

Figure 7A:
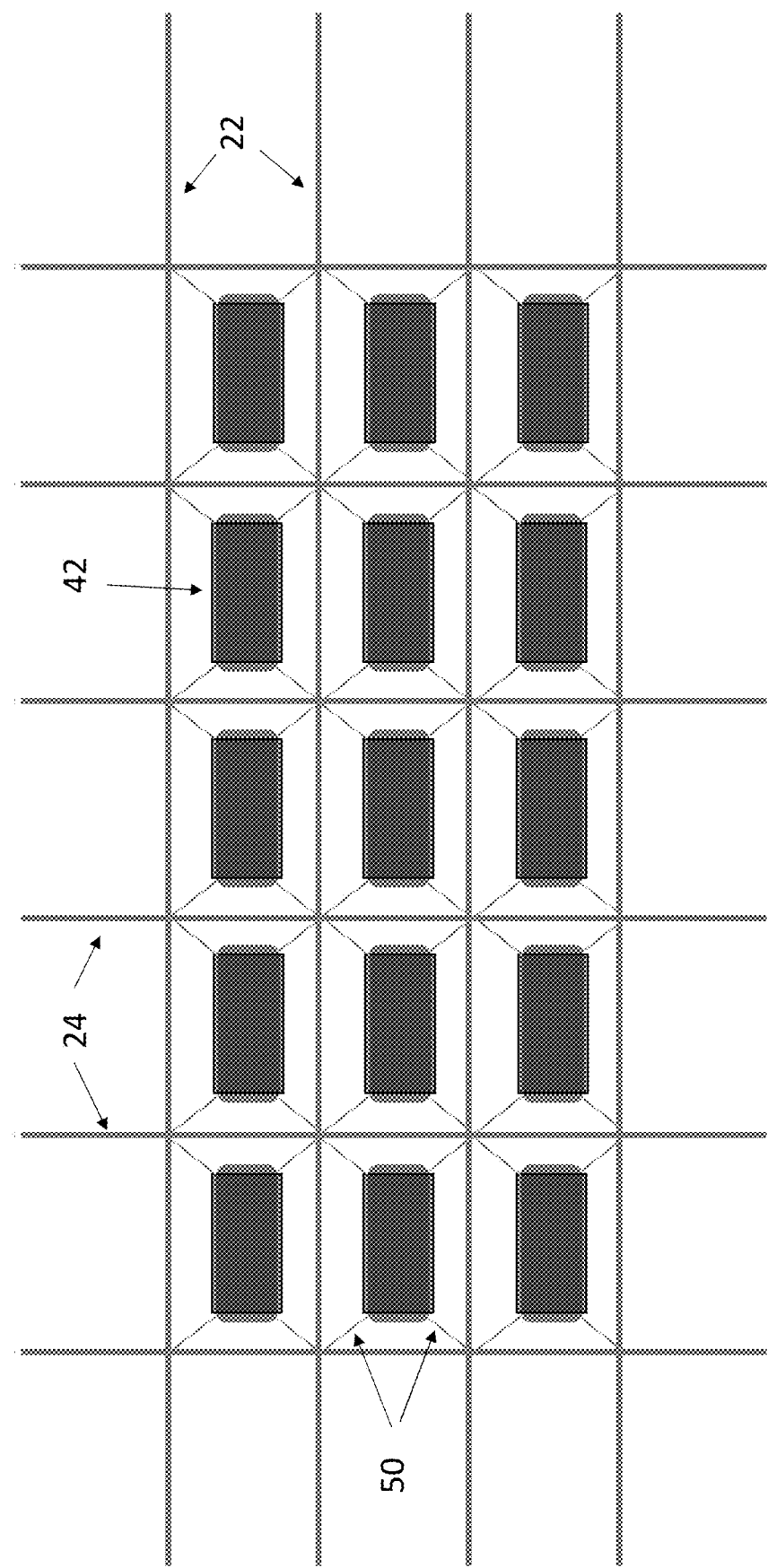
FIG. 7A is a top plan view of floating solar PV modules, with one floating solar PV module positioned in each of the openings in the grid of structural members.
Figure 7B:
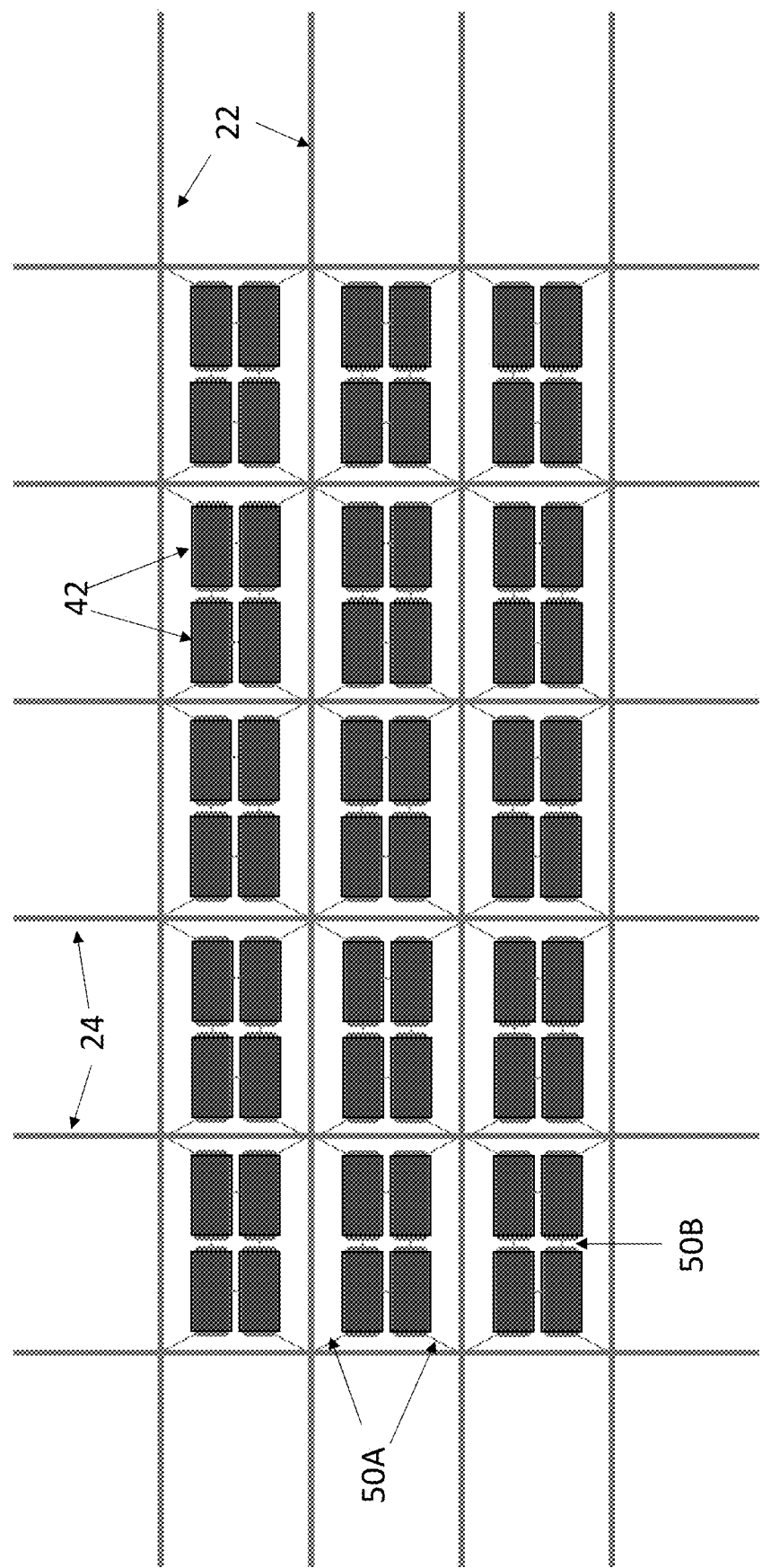
FIG. 7B is a view similar to FIG. 7A, but instead with four floating solar PV modules positioned in each of the openings in the grid of structural members.

FIG. 7A is a top plan view of floating solar PV modules 40/42, with one floating solar PV module positioned in each of the openings 25 in the grid of structural members. In this arrangement, elastic connectors 50 are connected to the four corners of each floating solar PV module 40/42. FIG. 7B is a view similar to FIG. 7A, but instead with four floating solar PV modules positioned in each of the openings in the grid of structural members. In this arrangement, four PV modules 40 are positioned in each opening 25 in the grid, and are held in position by a first set of elastic connectors 50A connecting the PV modules 42 or the PV module support pontoons 40 to the grid of structural members 22 and 24 and a second set of elastic connectors 50B connecting the PV modules 42 or the PV module support pontoons 40 to one another. It is to be understood that different numbers of PV modules 42 and pontoons 40 may be placed in openings 25, all keeping within the scope of the present invention. In addition, multiple PV modules 42 may all be mounted onto one support pontoon 40, or multiple support pontoons 40 may be used for each PV module, all keeping within the scope of the present invention.

FIGS. 8A and 8B are respective side elevation views of the array showing the advantage of the present elastic connectors as waves pass under the array. FIG. 8A corresponds to the arrangement of FIG. 2A, and FIG. 8B corresponds to the arrangement where the PV modules 42 are coupled directly to the grid of structural members 22/24. As can be seen, waves are passing under array 10. (Note: the height of the waves have been exaggerated for illustration purposes). In FIG. 8A, the use of elastic connectors 50 stretching and contracting permits PV module pontoons 40 to move with respect to structural members 22 and 24. As such, bending and torsional stresses on the grid of structural members 22/24 are not transmitted to PV modules 42. (As illustrated, PV modules 42 remain straight end to end). However, in FIG. 8B, fasteners 62 are instead used to connect the PV modules 42 to structural members 24. As can be seen, fasteners 62 have little flexibility. As a result, bending stresses exerted on structural members 24 are transferred to PV modules 42. (As illustrated, PV modules 42 bend somewhat end to end).

Figure 9B:
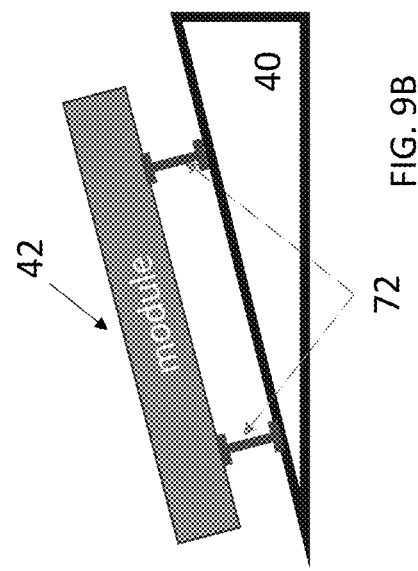
FIG. 9B is a side elevation illustration of a PV module mounted onto the top of a PC module support pontoon via a rail system.
Figure 9A:
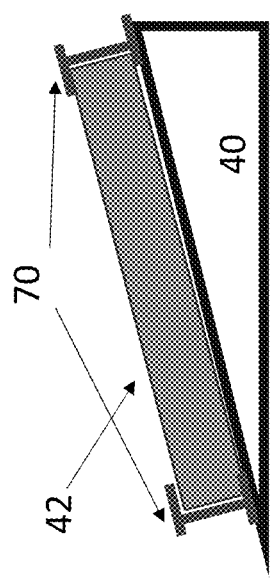
FIG. 9A is a side elevation illustration of a PV module mounted onto the top of a PV module support pontoon via a bracket system.

Next, FIG. 9A shows a PV module 42 mounted onto the top of a PV module support pontoon 40 via a bracket system 70. In this embodiment, brackets 70 are attached directly on top of support pontoon 40 by studs, and are spaced apart an appropriate distance such that PV module 42 is received therebetween and clamped into position. FIG. 9B is a side elevation illustration of a PV module mounted onto the top of a PV module support pontoon via a rail 72. In this embodiment, the top of rails 72 are fastened into position using mounting holes in the module frame or via clamps and brackets. This embodiment has the advantage of raising the PV modules 42 higher above the water (as compared to FIG. 9A). As can also be seen, the top surface of PV module supporting pontoon 40 can be angled with respect to the horizontal plane of the water surface. This has the advantage of positioning the PV module 42 at a tilt angle that can collect maximum sunlight over the course of a year.

In preferred embodiments, the plurality of grid supporting pontoons 30 and the plurality of PV module supporting pontoons 40 are flat-packable, membrane-based inflatable pontoons. In preferred embodiments, pontoons 30 and 40 may be made of TPO with a polymer reinforcing scrim. Other suitable membrane materials can include, but are not limited to, HDPE, LDPE, PET and EPDM.

Figure 10:
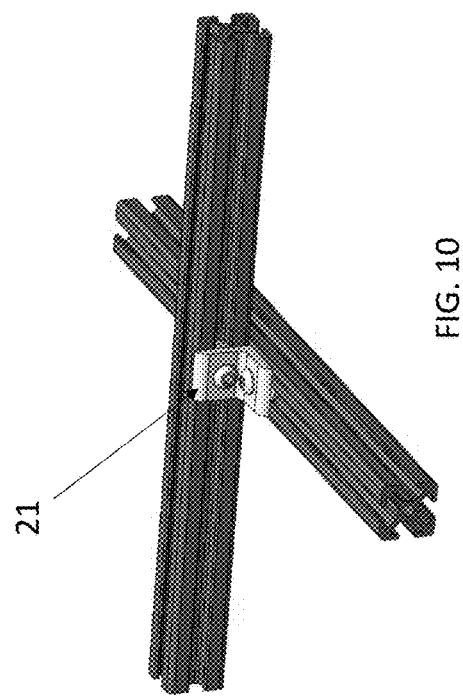
FIG. 10 is a perspective view of a pair of structural members connected together at a right angle.

Further details of exemplary structural members 22 and 24 will now be provided. FIG. 10 shows a perspective view of a pair of structural members connected together at a right angle with a mechanical fastener 21. This type of connection can be repeated across the array such that that regular openings 25 can be formed across the array. When structural members 22 and 24 are connected at right angles, openings 25 in the array will be rectangular. In preferred embodiments, the plurality of structural members 22 and 24 may be formed from an extruded polymer, including but not limited to glass-reinforced polyamide (nylon), or aluminum. Any suitable material which allows for some flexing is desired.

Figure 11C:
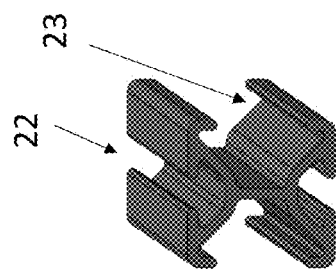
FIG. 11C is a perspective view of a third exemplary section of a structural member having channels for electrical cable management.
Figure 11B:
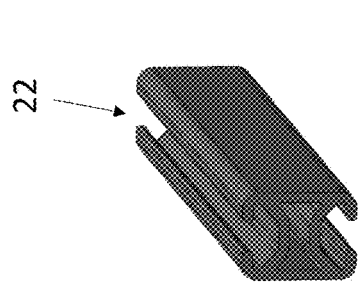
FIG. 11B is a perspective view of a second exemplary section of a structural member.
Figure 11A:
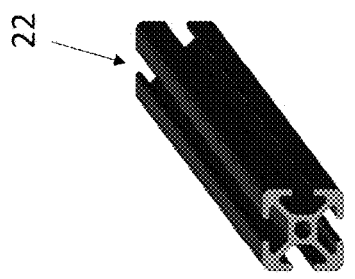
FIG. 11A is a perspective view of a first exemplary section of a structural member.

Next, FIGS. 11A, 11B and 11C show exemplary cross-sections of a structural member 22 or 24. FIG. 11A shows a structural member 22 having 4 channels. FIG. 11B is a perspective view of a second exemplary section of a structural member 22 having two channels. FIG. 11C shows a structural member 22 having channel 23 for electrical cable management.

FIG. 12A is an elevation view of a pair of L-brackets 80 connecting a pair of structural members 22 and 24 at a right angle to each other. FIG. 12B is an elevation view of a Cross-plate 82 linking three structural members (22, 24A and 24B) together at right angles. Structural members 24A and 24B are linked together end-to-end.

Lastly, FIG. 13A is an elevation view of a Splice 84 connecting the ends of two structural members 22A and 22B together. FIG. 13B is an elevation view of a Hinged Splice 86 connecting the ends of two structural members 22A and 22B together. Hinged Splice 86 permits one structural member 22 to move with respect to the other such that they are not always co-axial (for example, as waves pass under the array). L-Brackets 80, Cross-plate 82, Splice 84 and Hinged Splice can be made from various materials, including but not limited to Steel, Aluminum, Glass-reinforced polyamide (nylon), HDPE, and Fiberglass.

In alternate aspects of the invention, structural members 22 and/or 24 can be made to lengths that are multiples of the PV module lengths for ease of assembly and installation. In further alternate aspects, structural members 22 and/or 24 can be made from tubing filled with water (to add ballast to the array).

What is claimed is:

1. A structural support grid system for a floating solar array, comprising:
    a grid of structural members with open spaces between adjacent structural members;
    a plurality of grid supporting pontoons, the grid supporting pontoons supporting the grid of structural members;
    a plurality of PV module supporting pontoons;
    a plurality of PV modules, wherein each PV module is supported by one or more of the PV module supporting pontoons, and wherein the PV modules are positioned in the openings formed between the adjacent structural members; and
    a plurality of elastic connectors that isolate each of the PV modules from forces exerted on the grid of structural members, wherein each elastic connector connects the grid of structural members or one of the grid supporting pontoons to one of the PV module supporting pontoons or to one of the PV modules.

2. The system of claim 1, wherein the elastic connectors isolate the PV modules from movement of the grid of structural members.

3. The system of claim 1, wherein the elastic connectors permit restrained movement of each of the plurality of solar PV modules with respect to the grid of structural members.

4. The system of claim 1, wherein the elastic connectors permit limited linear and torsional movement of the solar PV modules with respect to the grid of structural members.

5. The system of claim 1, wherein the plurality of structural members are formed from an extruded polymer.

6. The system of claim 1, wherein the plurality of structural members intersect at right angles to form rectangular openings between adjacent structural members.

7. The system of claim 1, wherein the plurality of grid supporting pontoons are flat-packable, membrane-based inflatable pontoons.

8. The system of claim 1, wherein the plurality of PV module supporting pontoons are flat-packable, membrane-based inflatable pontoons.

9. The system of claim 1, wherein a single floating solar PV module is disposed in each of the openings.

10. The system of claim 1, wherein a plurality of floating solar PV modules are disposed in each of the openings.

11. The system of claim 1, wherein the elastic connectors can be interchangeably connected to either one of the PV module supporting pontoons or to one of the PV modules.

12. The system of claim 1, wherein one PV module is positioned within each opening in the grid, and wherein the PV module is held in position by four elastic connectors with one elastic connector being connected to each of four corners of the PV module supporting pontoon or the PV module.

13. The system of claim 1, wherein multiple (e.g.: four) PV modules are positioned in each opening in the grid, and wherein the multiple PV modules are held in position by a first set of elastic connectors connecting the PV modules or the PV module support pontoons to the grid and a second set of elastic connectors connecting the PV modules or the PV module support pontoons to one another.

14. The system of claim 1, wherein each of the PV modules is mounted on top of one of the PV module support pontoons.

15. The system of claim 14, wherein each PV module support pontoon has a top surface that is angled relative to the horizontal plane of the water.

16. The system of claim 1, wherein the structural members have channels for electrical cable management running therealong.

* * * * *